M. F. BISHOP.
APPLE CORER.
APPLICATION FILED JAN. 24, 1919.
1,317,263.
Patented Sept. 30, 1919.
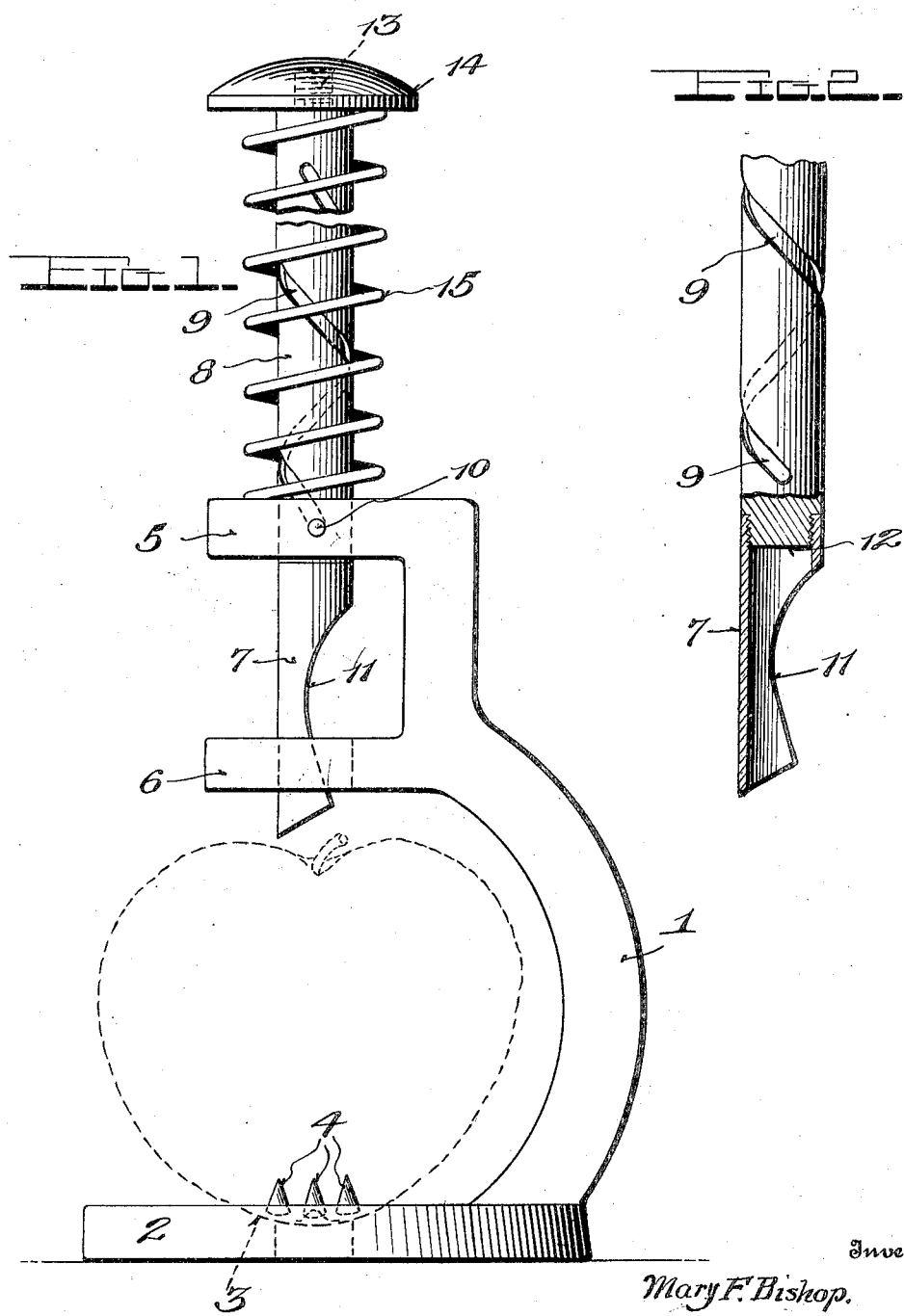
Inventor
Mary F. Bishop.
Attorney

UNITED STATES PATENT OFFICE.

MARY F. BISHOP, OF BOSTON, MASSACHUSETTS.

APPLE-CORER.

1,317,263.  Specification of Letters Patent.  Patented Sept. 30, 1919.

Application filed January 24, 1919. Serial No. 272,799.

*To all whom it may concern:*

Be it known that I, MARY F. BISHOP, a citizen of the United States, residing at the city of Boston, county of Suffolk, State of Massachusetts, have invented certain new and useful Improvements in Apple-Corers; and I do declare the following to be a full, clear, and exact description of the invention, such as will enable others skilled in the art to which it appertains to make and use the same.

This invention relates to certain new and useful improvements in an apple corer, and it has for its principal object to provide a coring mechanism in which the core cutter has a rotary motion imparted to it as it is advanced through the fruit.

The invention also resides in a corer embodying simplicity and great durability which enables its production on an economical basis so that every household may have one.

Further, the invention resides in the features of construction and their arrangements and combinations of parts hereinafter described and claimed, reference being had to the accompanying drawing wherein:—

Figure 1 is a side elevation of the improved apple corer; and

Fig. 2 is a fragmental view of the core cutter illustrating in section its mounting on the actuating plunger.

Referring more in detail to the drawing, the standard 1 rises from one edge of the base or table portion 2 which is provided with a concave recess or seat 3 to receive the apple, a plurality of upwardly extending prongs or spurs 4 (three triangularly disposed spurs being shown in the illustration) being located in the seat and designed to have the fruit forced downwardly thereon so that they become firmly embedded in the fruit and thus function to hold the same against turning with the cutter.

The standard carries at its upper end an overhanging pair of relatively superposed bracket arms 5 and 6 which are formed with registering openings to guidingly receive the cutter 7 and its actuating plunger 8. The latter is preferably a solid shaft formed with a peripheral spiral groove 9 into which a pin 10 extends from bracket arm 5 to coöperate with its cam face in imparting rotary movement to said vertically slidable plunger. The cutter consists of a tubular blade cut away at 11, to facilitate the removal of the core therefrom, and having its upper end internally screw threaded for ready connection with the reduced threaded lower end 12 of the plunger. To the upper end of the plunger is secured, as by the screw threaded connection 13, a handle 14 and compressed between the handle and the bracket arm 5 in encircling relation to the plunger is a coiled spring 15 which functions to return the cutter and plunger to their normal elevated position.

In the operation of the coring device, the fruit is thrust down onto the spurs 4 until it engages with its seat 3, and then the plunger is depressed forcing the cutter axially through the apple and imparting to the cutter, by reason of the cam slot and coöperating pin, a rotary movement which facilitates the piercing action and affords a neat cut. Obviously, the plunger is of sufficient length to permit the cutter to pass through the fruit before the handle 14 is arrested by the compressed spring 15 and bracket 5. Upon releasing the operative pressure from the handle the spring will retract the cutter and in so doing the core carried thereby will engage the lower bracket 6 to effect removal of the core from the cutter.

The core-removing operation is expeditiously performed by a very simple operation. The cutter may readily be removed from the plunger for cleansing or renewal, and the arrangement of parts result in an economical device embodying great durability since there are practically no parts which will get out of order.

What is claimed is:

In an apple corer, a standard having a base formed to support the fruit, a pair of lateral spaced arms on the standard above the base, a spring pressed depressible plunger slidable through the arms, means to rotate the plunger upon depression thereof, and a corer secured to the lower end of the plunger, said corer being open on one side with the open side disposed to lie in the space between the arms when the plunger is at its normal upper position so as to discharge the cut core in said space between the arms.

In testimony whereof I affix my signature.

MARY F. BISHOP.

Copies of this patent may be obtained for five cents each, by addressing the "Commissioner of Patents, Washington, D. C."